United States Patent
Luo et al.

(10) Patent No.: US 9,445,080 B2
(45) Date of Patent: Sep. 13, 2016

(54) STEREO CAMERA APPARATUS, SELF-CALIBRATION APPARATUS AND CALIBRATION METHOD

(71) Applicant: Industrial Technology Research Institute, Hsinchu (TW)

(72) Inventors: An-Chun Luo, Taichung (TW); Hong-Tu Yu, Hsinchu (TW); Chih-Hsiang Yu, Hsinchu (TW); Kun-Lung Tseng, New Taipei (TW); Chung-Wei Lin, Tainan (TW); Wei-Hao Huang, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 572 days.

(21) Appl. No.: 13/945,931

(22) Filed: Jul. 19, 2013

(65) Prior Publication Data

US 2014/0118503 A1    May 1, 2014

Related U.S. Application Data

(60) Provisional application No. 61/720,380, filed on Oct. 30, 2012.

(30) Foreign Application Priority Data

Dec. 25, 2012 (TW) .............................. 101149879 A

(51) Int. Cl.
 *H04N 13/02* (2006.01)
(52) U.S. Cl.
 CPC ...... *H04N 13/0246* (2013.01); *H04N 13/0239* (2013.01)
(58) Field of Classification Search
 CPC .................. H04N 13/0239; H04N 13/0246
 See application file for complete search history.

(56) References Cited

U.S. PATENT DOCUMENTS 5,142,642 A * 8/1992 Sudo .............................. 348/47
6,028,954 A * 2/2000 Tomita et al. ................ 382/154
(Continued)

FOREIGN PATENT DOCUMENTS

| CN | 1441314 | 9/2003 |
| CN | 102013096 | 4/2011 |

(Continued)

OTHER PUBLICATIONS

Sandro Esquivel et al., "Calibration of a Multi-Camera Rig From Non-Overlapping Views," Proceedings of the 29th DAGM conference on Pattern recognition, Sep. 2007, pp. 82-91.

(Continued)

*Primary Examiner* — Sath V Perungavoor
*Assistant Examiner* — Peter D Le
(74) *Attorney, Agent, or Firm* — Jianq Chyun IP Office

(57) ABSTRACT

A stereo camera apparatus including an image capturing device, an optical axis controlling module and a calculating module is provided. The image capturing device is suitable for obtaining a stereo image, and the image capturing device includes a plurality of image capturing units. The optical axis controlling module is coupled to the image capturing device. The calculating module is coupled to the image capturing device and the optical axis controlling module, wherein the calculating module calculates a calibration condition according to the stereo image. The optical axis controlling module adjusts directions of imaging optical axes of the image capturing units. After being adjusted by the optical axis controlling modules, the imaging optical axes of the image capturing units are aligned. Besides, a self-calibration apparatus and a method of calibration are also provided.

22 Claims, 7 Drawing Sheets

(56) References Cited

U.S. PATENT DOCUMENTS

| | | | |
|---|---|---|---|
| 6,621,921 B1* | 9/2003 | Matsugu et al. | 382/154 |
| 7,557,835 B2 | 7/2009 | Douret et al. | |
| 8,009,898 B2 | 8/2011 | Kim | |
| 8,072,654 B2 | 12/2011 | Lefevere | |
| 8,120,644 B2 | 2/2012 | Chen | |
| 8,238,741 B2 | 8/2012 | Pace et al. | |
| 2001/0014221 A1 | 8/2001 | Tomita | |
| 2007/0084927 A1* | 4/2007 | Itou et al. | 235/454 |
| 2007/0140673 A1 | 6/2007 | Butler-Smith et al. | |
| 2007/0146478 A1 | 6/2007 | Butler-Smith et al. | |
| 2008/0123938 A1 | 5/2008 | Kim | |
| 2008/0144924 A1 | 6/2008 | Hoffmann | |
| 2009/0128621 A1 | 5/2009 | Passmore et al. | |
| 2010/0166294 A1 | 7/2010 | Marrion et al. | |
| 2010/0208034 A1 | 8/2010 | Chen | |
| 2011/0018782 A1 | 1/2011 | Lu et al. | |
| 2011/0057948 A1 | 3/2011 | Witt et al. | |
| 2011/0085788 A1 | 4/2011 | Pace et al. | |
| 2012/0002060 A1 | 1/2012 | Kusanagi | |
| 2012/0056988 A1 | 3/2012 | Stanhill et al. | |
| 2012/0147139 A1 | 6/2012 | Li et al. | |
| 2012/0194652 A1* | 8/2012 | Myokan et al. | 348/50 |
| 2012/0327197 A1* | 12/2012 | Yamashita et al. | 348/50 |
| 2013/0038700 A1* | 2/2013 | Horita | 348/47 |
| 2013/0265395 A1* | 10/2013 | Vala et al. | 348/47 |

FOREIGN PATENT DOCUMENTS

| | | |
|---|---|---|
| CN | 102325262 | 1/2012 |
| JP | H11341522 | 12/1999 |
| TW | M373507 | 2/2010 |
| TW | M402445 | 4/2011 |

OTHER PUBLICATIONS

Rostam Affendi Hamzah and Sani Irwan Md Salim, "Software Calibration for Stereo Camera on Stereo Vision Mobile Robot using Tsai's Method," International Journal of Computer Theory and Engineering, vol. 2, No. 3, Jun. 2010, pp. 390-394.

Dong-Hwan Lim and Tae-Yong Kuc, "Self-Aligning-Calibration of a Stereo Vision System," ICROS-SICE International Joint Conference, Aug. 18-21, 2009, pp. 5413-5416.

Resko, B. and Baranyi, P., "Stereo Camera Alignment based on Disparity Selective Cells in the Visual Cortex," IEEE 3rd International Conference on Computational Cybernetics, Apr. 13-16, 2005, pp. 285-290.

Knight, J. and Reid, I., "Active Visual Alignment of a Mobile Stereo Camera Platform," Proceedings of the IEEE International Conference on Robotics & Automation, Apr. 2000, pp. 3203-3208.

"Office Action of China Counterpart Application", issued on Jul. 23, 2015, p. 1-p. 10.

"Office Action of Taiwan Counterpart Application", issued on Feb. 16, 2015, p. 1-p. 7.

* cited by examiner

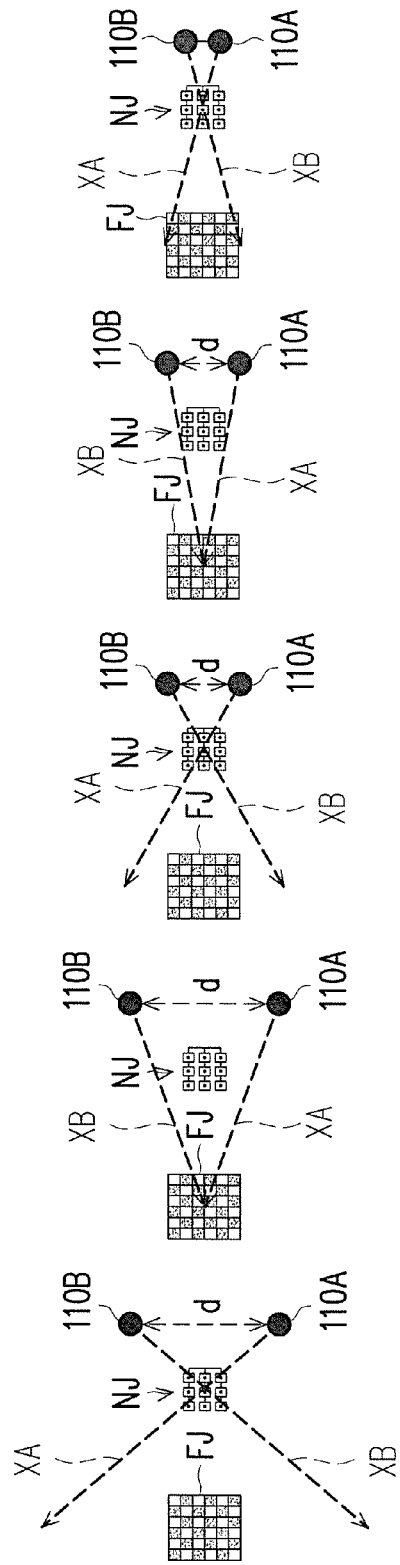

STEREO CAMERA APPARATUS, SELF-CALIBRATION APPARATUS AND CALIBRATION METHOD

CROSS-REFERENCE TO RELATED APPLICATION

This application claims the priority benefits of U.S. provisional application Ser. No. 61/720,380, filed on Oct. 30, 2012 and Taiwan application serial no. 101149879, filed on Dec. 25, 2012. The entirety of each of the above-mentioned patent applications is hereby incorporated by reference herein and made a part of this specification.

TECHNICAL FIELD

The disclosure relates to a stereo camera apparatus, a self-calibration apparatus and a calibration method.

BACKGROUND

As 3D (three-dimensional) film becomes popular and gross in recent years, consumer demands for 3D (three-dimensional) digital images have also increased. As for the current major 3D digital images, an actual shooting of stereo image using a stereo camera has gradually become one of the major trends as in addition to the use of computer synthesis and 2D to 3D conversion. In general, the actual shooting using the stereo camera is to use more than two stereo cameras to perform image capture shooting of the stereo image. Following the increases in the consumer demands for the 3D digital images, a variety of stereo cameras and filming equipments have sprung and become available. Currently, the most common stereo cameras are mainly divided into two major rigs: a side-by-side rig and a mirror rig.

In detail, a dimensional sense of the generated stereo image is based on a certain parallax between two eyes since the two eyes of the human are mainly aligned along a horizontal direction; in other words, an effective stereo image parallax is a parallax in the horizontal direction, and therefore, no obvious parallax in a vertical direction or other directions should be appeared in an artificial stereo image, so as to avoid the human eyes from being unable to focus favorably when viewing the artificial stereo image due to a parallax other than the parallax in the horizontal direction, thereby effecting a stereo image quality or even producing a dizziness or discomfort feeling. Currently, before shooing the stereo image, the stereo camera has to go through a manually calibration process so as to enable a plurality of camera shots in the stereo camera to be firstly and favorably aligned, and then a distance between and a direction of each camera shot are correspondingly adjusted according to shooting requirements. However, since a current major method is to adopt the manual calibration method, in general, an experienced calibration technician has to spend about 2 to 3 hours just to perform one calibration, whereas there are usually more than 200 camera shots when shooting a 3D film; in other words, time and money spent on a film is very impressive, and thus, a longer calibration time, other than causing a great loss in money, may most likely result in shooting pressures on casts and crew (e.g., schedule factors of movie stars or an allowance of shooting time limit in a special country allows). Therefore, how to provide a fast and accurate calibration method for the stereo camera has become one of the most current problems to be solved.

SUMMARY

The disclosure provides a stereo camera apparatus comprising an image capturing device, an optical axis controlling module and a calculating module. The image capturing device is suitable for obtaining a stereo image, and the image capturing device comprises a plurality of image capturing units. The optical axis controlling module is coupled to the image capturing device. The calculating module is coupled to the image capturing device and the optical axis controlling module, wherein the calculating module calculates a calibration condition according to the stereo image, the optical axis controlling module adjusts directions of imaging optical axes of the image capturing units in the image capturing device according to the calibration condition, and after being adjusted by the optical axis controlling module, imaging optical axes of the image capturing units are aligned.

The disclosure provides a calibration method of a stereo camera apparatus comprising: capturing a plurality of image signals via a plurality of image capturing units; executing an alignment deviation calculation to the image signals, and calculating a deviation value between the image signals; determining whether the deviation value is higher than a threshold value; and if the deviation value is higher than the threshold value, then executing an alignment step for correcting the deviation value so as to correct positions of the image capturing units and directions of imaging optical axes, and re-executing an alignment deviation calculation to the image signals until the deviation value is lower than the threshold value; if the deviation value is lower than the threshold value, then completing the calibration.

The disclosure provides a self-calibration apparatus suitable for self-calibrating positions of a plurality of image capturing units and directions of imaging optical axes. The self-calibration apparatus comprises an optical axis controlling module and a calculating module. The optical axis controlling module is coupled to the image capturing units. The optical axis controlling module comprises a plurality of carriers (stages) for assembling the image capturing units. The calculating module is coupled to the image capturing units and the optical axis controlling module. Wherein, the calculating module calculates a calibration condition according to a plurality of images captured by the image capturing units, the optical axis controlling module adjusts the carriers according to the calibration condition and driven adjusts the directions of the imaging optical axes of the image capturing units, and after being adjusted by the optical axis controlling module, the imaging optical axes of the image capturing units are aligned.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

FIG. 5A through FIG. 5E are schematic diagrams illustrating changes of each imaging optical axes during the calibration process according to the embodiment depicted in FIG. 3.

DETAILED DESCRIPTION OF DISCLOSED EMBODIMENTS

Figure 1:
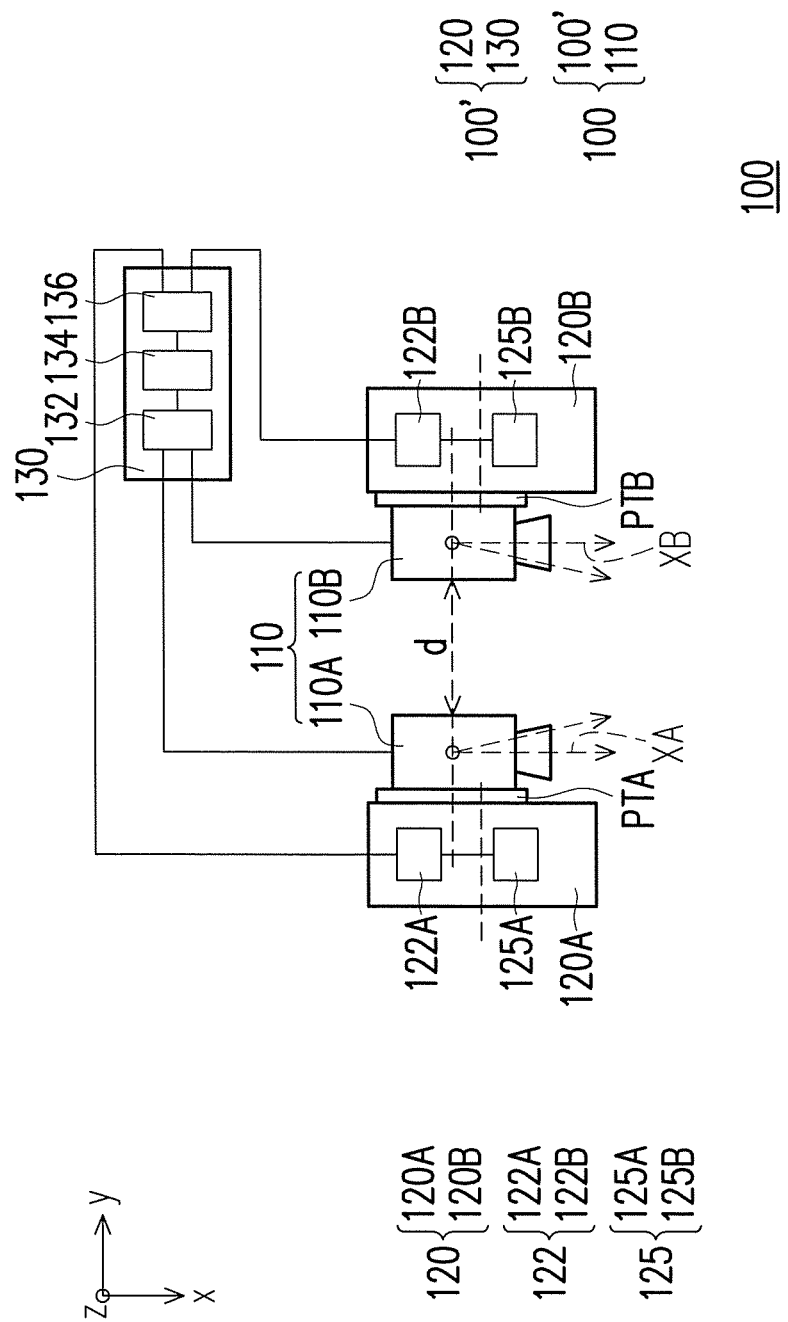
FIG. 1 is a schematic diagram illustrating a stereo camera apparatus according to an embodiment of the disclosure.

FIG. 1 is a schematic diagram illustrating a stereo camera apparatus according to an embodiment of the disclosure. Referring to FIG. 1, in the present embodiment, a stereo camera apparatus 100 may comprise an image capturing device 110, an optical axis controlling module 120 and a calculating module 130. The image capturing device 110 is suitable for obtaining a stereo image. In addition, the image capturing device 110 may comprise a plurality of image capturing unit. For example, as illustrated in FIG. 1, the image capturing device 110 comprises an image capturing unit 110A and an image capturing unit 110B, and the image capturing unit 110A and the image capturing unit 110B are aligned side-by-side. Nevertheless, the embodiment is not limited thereto; in other embodiments, the image capturing device 110 may comprise even more image capturing units. In the present embodiment, the optical axis controlling module 120 may be coupled to the image capturing device 110. For example, as illustrated in FIG. 1, an amount of the optical axis controlling module 120 may also be 2. An optical axis controlling module 120A and an optical axis controlling module 120B may be respectively coupled to the image capturing unit 110A and image capturing unit 110B, so as to respectively control the image capturing units 110A and image capturing unit 110B. Nevertheless, in other embodiments, the amount of the optical axis controlling module 120 may also be in accordance with an amount of the image capturing units, and is not limited to 2. In addition, the optical axis controlling module 120 may also control a spacing of the semi-transreflective units and deflection angles, so as to control image optical axes of the optical axis controlling modules 120A, 120B. Moreover, the calculating module 130 may be coupled to the image capturing device 110 and the optical axis controlling module 120. The calculating module 130 may calculate a calibration condition according to the stereo image, the optical axis controlling module 120 may automatically adjust directions of an imaging optical axis XA and an imaging optical axis XB of the image capturing unit 110A and the image capturing unit 110B in the image capturing device 110 according to the calibration condition until the calibration condition is satisfied. Further details of the calibration condition are described in the follow-up. For example, in the present embodiment, the optical axis controlling module 120 may control front and rear positions (X axis), high and low positions (Z axis), flip angles (roll) and inclination angles (pitch) of the image capturing unit 110A and the image capturing unit 110B. Moreover, the optical axis controlling module 120 may also control a horizontal spacing (an inter-axial distance; viz. along a Y axis direction in FIG. 1) and deflection angles of the image capturing unit 110A and the image capturing unit 110B.

After being adjusted by the optical axis controlling module 120, the imaging optical axis XA of the image capturing unit 110A and the imaging optical axis XB of the image capturing unit 110B are aligned. For example, in the present embodiment, an optical axis alignment described in the embodiment of FIG. 1 is namely that, the imaging optical axis XA and the imaging optical axis XB are parallel to each other in the space and at least located on a same horizontal plane (e.g., on X-Y axial plane in FIG. 1). In other words, after the imaging optical axis XA of the image capturing unit 110A and the imaging optical axis XB of the image capturing unit 110B are calibrated by the optical axis controlling module 120, deviations between the image capturing unit 110A and the image capturing unit 110B in the directions of the inclination angles (pitch), the deflection angles (yaw) and the flip angles (roll) are reduced to the lowest. Moreover, the imaging optical axis XA and the imaging optical axis XB are aligned in the horizontal direction and the vertical direction. Furthermore, in the present embodiment, the imaging optical axis XA and the imaging optical axis XB are located on the same horizontal plane. In the present embodiment, the inclination angle, for example, is an angle variation of the imaging optical axis XA that is produced when the image capturing unit 110A is rotating using the Y axis as a rotational axis, the deflection angle, for example, is an angle variation of the imaging optical axis XA produced when the image capturing unit 110A is rotating using the Z axis as a rotational axis, and the flip angle, for example, is an angle variation of the imaging optical axis XA produced when the image capturing unit 110A is rotating using the X axis as a rotational axis. With this, during an actual shooting, since the imaging optical axis XA and the imaging optical axis XB are parallel to each other and located on the same horizontal plane, and together are similar to a two eyes visual mechanism of the human being, a photographer may simply and correspondingly adjust a distance d of the horizontal spacing (inter-axial distance) and a convergence degree (viz. deflection angle θ) between the image capturing unit 110A and the image capturing unit 110B according to a depth size (sense of space) and concavity (dimensional sense) of an image required for shooting the stereo image, so as to avoid a shooting failure caused by the deviation in the vertical direction or in the angles (inclination angle and flip angle) or an image from causing discomfort to viewers. At the same time, since the image capturing unit 110A and the image capturing unit 110B may be automatically controlled by the optical axis controlling module 120, a lot of time consumed by performing a manual correction may be saved, thereby saving shooting cost and increasing shooting efficiency.

In detail, the optical axis controlling module 120 may comprise a drive controller 122 and a plurality of drivers 125, the drive controller 122 may drive the drivers 125 to change positions of the image capturing unit 110A and the image capturing unit 110B and directions of the imaging optical axis XA and the imaging optical axis XB. For example, in the present embodiment, the drive controller 122 and the drivers 125 may respectively comprise a drive controller 122A and drivers 125A corresponded to the image capturing unit 110A, and comprise a drive controller 122A and drivers 125B corresponded to the image capturing unit 110B. Moreover, the drivers 125 may also comprise a precision motor capable of moving linearly forward or backward and drive mechanism members related to the precision motor, and under the control of the drive controller 122, the positions and the angles (e.g., positions of the aforementioned X axis, Y axis and Z axis in the three-dimensional coordinate space, and angle directions of the inclination angle, the deflection angle and the flip angle; in other words, in the present embodiment, each image capturing unit, for example, may respectively control each position and angle direction with six drivers 125) of the image capturing unit 110A and the image capturing unit 110B may be driven to be changed; however, the disclosure is not limited thereto. In addition, the optical axis controlling module 120 may also comprise a plurality of carriers (stages), such as a carrier PTA and a carrier PTB shown in FIG. 1, so as to respectively and correspondingly install the image capturing unit 110A and the image capturing unit 110B. In the present embodiment, the carriers PTA and PTB, for example, are platforms capable of fix locking the image capturing unit 110A and the image capturing unit 110B; however, in other embodiments, the carriers PTA and PTB may also be implemented as other types, such as support arms, brackets and other apparatuses suitable for fix installing the carriers PTA and PTA, but the disclosure is not limited thereto.

Furthermore, the optical axis controlling module 120 and the calculating module 130 comprised by the stereo camera apparatus 100 depicted in the embodiment of FIG. 1 may also form a self-calibration apparatus 100', and may collocate with all kinds of different imaging apparatuses according to a shooting requirement; for instance, a framework of the stereo camera apparatus may be a stereo camera, a dual camera, a dual digital camera, or any other stereo signal generating device; but the disclosure is not limited thereto. With this, the photographer may switch to different imaging apparatuses according to a shooting venue or environment (e.g., polar region, deep-sea, desert, space or so forth) during the actual shooting, so as to have an excellent shooting flexibility, and to have also an automatic calibration function similar to that of the stereo camera apparatus 100.

Figure 2:
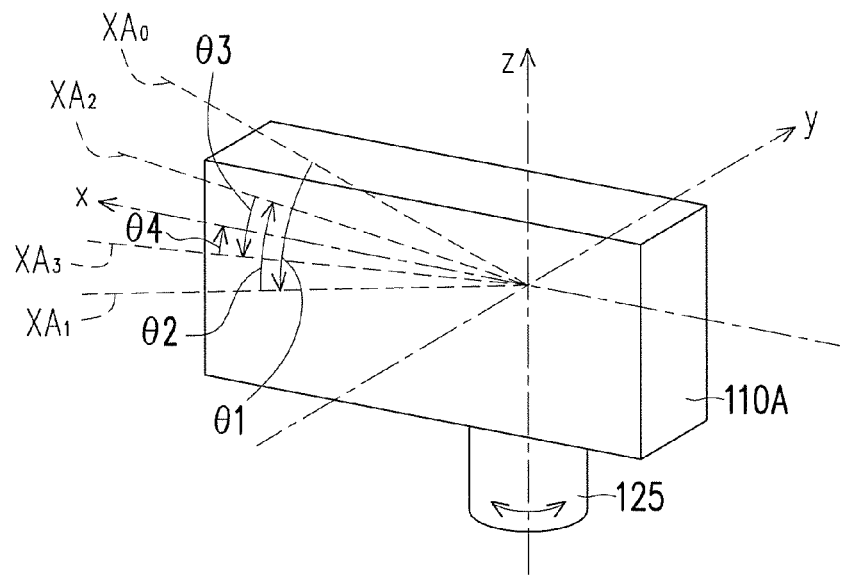
FIG. 2 illustrates a positioning process schematic diagram of divers according to the embodiment depicted in FIG. 1.

In further detail, in the present embodiment, the drivers 125 may move back and forth to enable the positions and the directions of the imaging optical axis XA and the imaging optical axis XB of the image capturing unit 110A and the image capturing unit 110B to approach positioning. For example, FIG. 2 illustrates a positioning process schematic diagram of divers according to the embodiment depicted in FIG. 1; and referring to FIG. 1 and FIG. 2, the image capturing unit 110A is taken as an example, wherein before the image capturing unit 110A is being calibrated, the imaging optical axis XA is located a direction right above an optical axis XA0. If the imaging optical axis XA of the image capturing unit 110A is to position to the X axis direction according to the aforementioned calibration condition, the drivers 125 rotates using the Z axis as the rotational axis, so as to enable the image capturing unit 110A to rotate and thereby drives the imaging optical axis XA to firstly move from a direction of the optical axis XA0 into a direction of an optical axis XA1, and next, the drivers 125 enables the image capturing unit 110A to rotate and thereby drives the optical axis XA1 to further move into a direction of an optical axis XA2, wherein an angle θ1 of a first rotation is larger than an angle θ2 of a second rotation, and after these two rotations, the imaging optical axis XA and the direction of the X axis are closer to being parallel. Next, the drivers 125 further drives the image capturing unit 110A to rotate and thereby drives the optical axis XA2 to move into a direction of an optical axis XA3, and afterward, the drivers 125 again drives the image capturing unit 110A to rotate and thereby drives the optical axis XA3 to move again into the direction of the X axis, wherein an angle θ3 of a third rotation is greater than an angle θ4 of a fourth rotation, and these two rotations, the imaging optical axis XA and the direction of the X axis, as compared to the previous rotations, are even more close to being parallel; the aforementioned process may be repeated until the imaging optical axis XA and the direction of the X axis become parallel. In other words, the drivers 125 may repeat the back and forth rotation for several times so that the imaging optical axis XA and the X axis are substantially parallel. In the present embodiment, numbers of rotation times are only taken as an example for illustrating the embodiment, such that the disclosure is not limited thereto. In addition, each image capturing unit in the image capturing device 110 may also approach positioning via this mechanism. Furthermore, the optical axis controlling module 120 may fix the positions of the image capturing unit 110A and the image capturing unit 110B after the image capturing unit 110A and the image capturing unit 110B are adjusted. With this, it may further ensure that the image capturing unit 110A and the image capturing unit 110B after being calibrated can be maintained and are not easily changed.

In addition, referring to FIG. 1, in the present embodiment, the calculating module 130 may further comprise a signal acquisition unit 132, an arithmetic unit 134 and a command signal output unit 136. The signal acquisition unit 132 may receive images respectively captures by the image capturing units 110A and 110B. The arithmetic unit 134 is coupled to the signal acquisition unit 132. For example, the arithmetic unit 134 may be a computer, a field programmable gate array (FPGA) or an embedded system board; however, the disclosure is not limited thereto. The arithmetic unit 134 may calculate the calibration condition according to features and corresponding relationships between the images respectively captured by the image capturing units 110A and 110B. The command signal output unit 136 may convert the calibration condition into a control signal to output to the optical axis controlling module 120.

Figure 3:
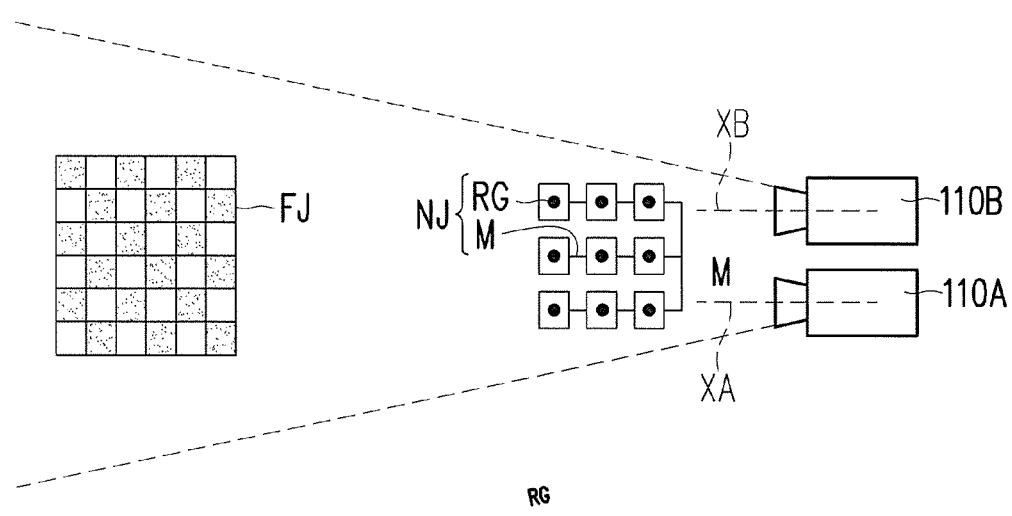
FIG. 3 illustrates a calibration schematic diagram of the stereo camera apparatus according to the embodiment depicted in FIG. 1.
Figure 4A:
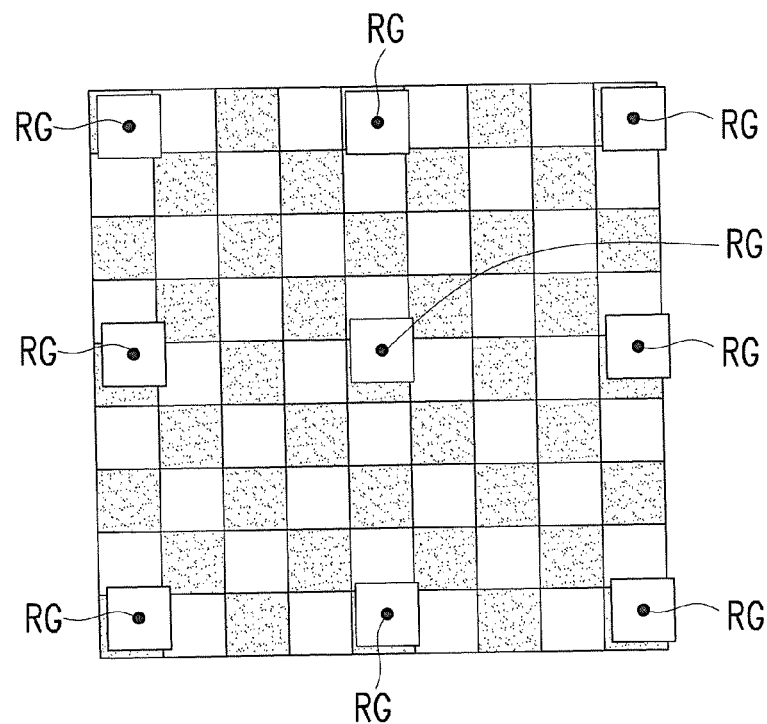
FIG. 4A and FIG. 4B respectively illustrate images respectively captured by each image capturing unit depicted in FIG. 3.
Figure 4B:
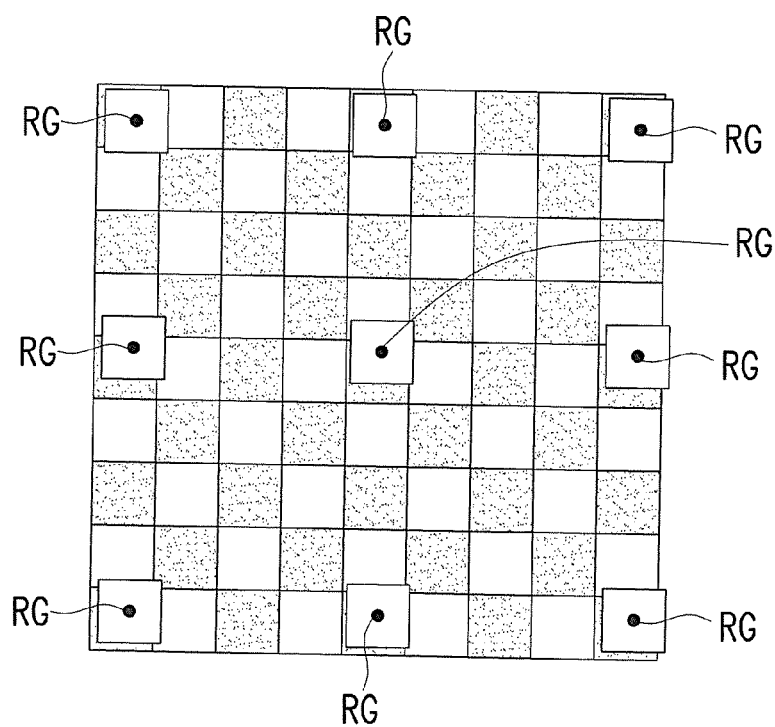
Figure 4C:
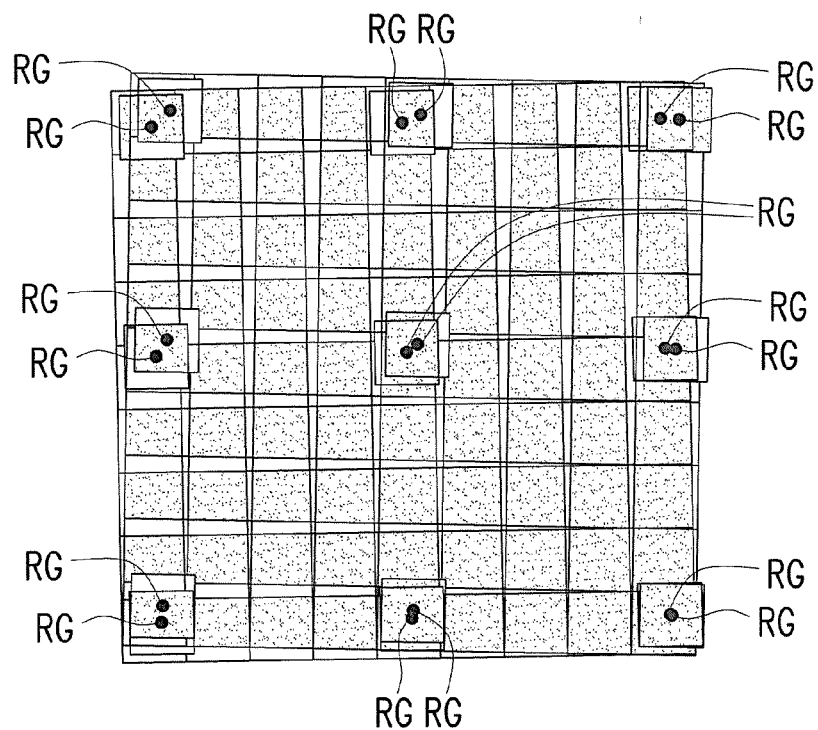
FIG. 4C illustrates differential images of the images depicted in FIG. 4A and FIG. 4B.
Figure 4D:
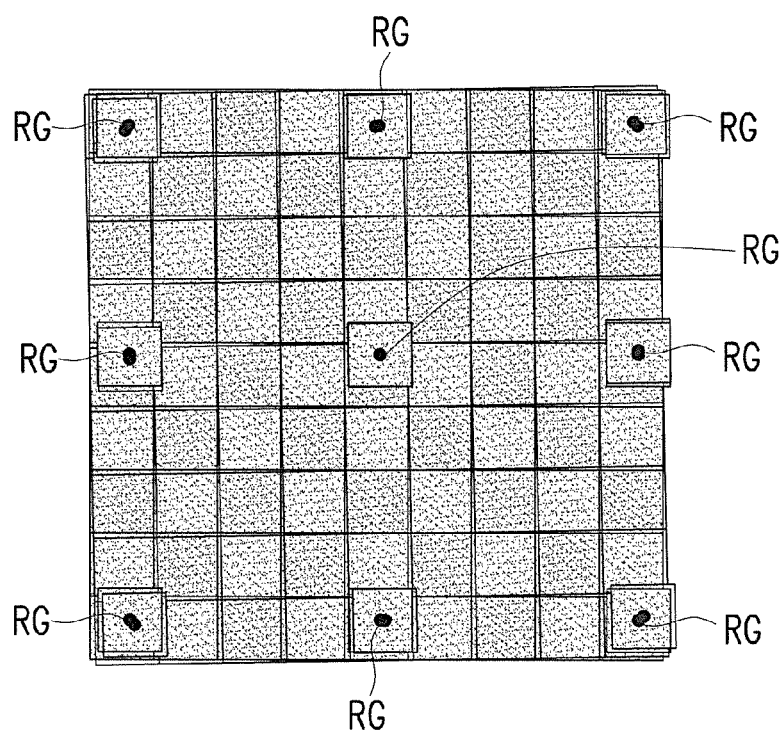
FIG. 4D illustrates the differential images between the images captured by each image capturing unit after being adjusted.

FIG. 3 illustrates a calibration schematic diagram of the stereo camera apparatus according to the embodiment depicted in FIG. 1, FIG. 4A and FIG. 4B respectively illustrate images respectively captured by each image capturing unit depicted in FIG. 3, FIG. 4C illustrates differential images of the images depicted in FIG. 4A and FIG. 4B, and FIG. 4D illustrates the differential images between the images captured by each image capturing unit after being adjusted. Referring to FIG. 1 through FIG. 4B, in the present embodiment, when the image capturing unit 110A and the image capturing unit 110B in the image capturing device 110 are not yet calibrated, a near object NJ and a far object FJ disposed in front of the image capturing device 110 may be used to calibrate the image capturing unit 110A and the image capturing unit 110B. A distance between the near object NJ and the image capturing device 110 is closer than a distance between the far object FJ and the image capturing device 110; and the near object NJ may comprise a plurality of feature points RG configured to calibrate the image capturing device 110, whereas the far object FJ may be a reference object comprising an obvious feature, not comprising the near object NJ and a feature image of the feature points RG (namely, the features of the near object NJ and the far object FJ may not be too similar so as to prevent a calibration error). For example, in the present embodiment, the near object NJ is a nine-points calibration plate constituted of the plurality of feature points RG disposed on a frame M, and the far object FJ may have checkerboard-grains. The image capturing unit 110A and the image capturing unit 110B, in addition to being able to shoot the image of the plurality of feature points RG on the near object NJ, may also shoot the far object FJ located behind the near object NJ through spacings between the nine-points calibration plate of the near object NJ, as illustrated in FIG. 3. In the present embodiment, images captured by the imaging optical axis XA of the image capturing unit 110A and the imaging optical axis XB of the image capturing unit 110B before the calibration are respectively illustrated as FIG. 4A and FIG. 4B; and by subtracting the images of FIG. 4A and FIG. 4B with each other, a differential image such as FIG. 4C may be obtained.

Since the image capturing unit 110A and the image capturing unit 110B are not yet calibrated, the positions at every direction and the angle directions may all have differences, thereby reacting on the captured images. Referring to FIG. 4C, wherein the feature points RG and the checker-grains (viz. the images of the far object FJ) are not aligned and are have devotions perpendicular to the horizontal direction. In other words, in the present embodiment, based on an obvious degree of markings of the differential images caused by the differences between the positions and angle directions of the image capturing unit 110A and the image capturing unit 110B in each direction illustrated in FIG. 4C, the calibration condition of the present embodiment may be calculated, accordingly. For example, in the present embodiment, the calculating module 130 may calculate degrees of change in the positions and the angle directions required by the imaging optical axis XA and the imaging optical axis XB when the obvious degree of the markings (such as a thickness of the markings) in the differential image according to the differential image (as illustrated in FIG. 4C) of the stereo image (viz. the images illustrated in FIG. 4A and FIG. 4B) is reduced to the lowest, namely, the calibration condition. Afterward, the optical axis controlling module 120 may automatically adjust the directions of the imaging optical axis XA of the image capturing unit 110A and the imaging optical axis XB of the image capturing unit 110B in the image capturing device 110 according to the calibration condition until the calibration condition is satisfied, namely, until the markings of the differential image in FIG. 4C are nearly disappeared, as illustrated in FIG. 4D. As such, it may ensure that the image capturing unit 110A and the image capturing unit 110B are favorably calibrated in the directions and the angles, so as to avoid the shooting failure, as described in the embodiment of FIG. 1, which is not repeated herein.

FIG. 5A through FIG. 5E are schematic diagrams illustrating changes of each imaging optical axes during the calibration process according to the embodiment depicted in FIG. 3. Furthermore, referring to FIG. 5A, in the present embodiment, during the calibration process, the imaging optical axis XA and the imaging optical axis XB are firstly aligned using the near object NJ; in other words, the image capturing unit 110A and the image capturing unit 110B are respectively adjusted until the feature points RG in the respective captured images are overlapped. Then, referring to FIG. 5B, the imaging optical axis XA and the imaging optical axis XB are aligned using the far object FJ; in other words, the image capturing unit 110A and the image capturing unit 110B are respectively adjusted until the checkerboard-grains in the respective captured images are overlapped. Afterward, the imaging optical axis XA and the imaging optical axis XB are aligned using the near object NJ, as illustrate in FIG. 5C; and next, the imaging optical axis XA and the imaging optical axis XB are aligned using the far object FJ. By repeatedly using the near object NJ and the far object FJ to align the imaging optical axis XA and the imaging optical axis XB until the feature points RG in the images respectively captured by the image capturing unit 110A and image capturing unit 110B are overlapped and the checkerboard-grains are also overlapped. Now, the differential image formed by subtracting the images respectively captured by the image capturing unit 110A and the image capturing unit 110B may be a nearly all black differential image as illustrated in FIG. 4D. The aforementioned calibration may determine the calibration condition through the calculating module 130, then may be generated by using the optical axis controlling module 120 to automatically adjust the image capturing device 110 according to the calibration condition, and therefore, the stereo camera apparatus 100 may be calibrated fast and accurately, thereby saving the shooting costs and enhancing the shooing shooting efficiency. However, the nearly all black differential image illustrated in FIG. 4D is only taken for an example for describing the present embodiment; in other embodiments, other different calibration conditions and deviation threshold values (e.g., until a thickness of the markings in the differential image is smaller than a certain degree) may also be used.

In detail, in the present embodiment, the images captured by the image capturing unit 110A (or the image capturing unit 110B) may further be designated as referential images, and then the optical axis controlling module 120 adjusts the positions and the angle directions of the image capturing unit 110B (or the image capturing unit 110A) through the calibration condition, which is calculated using a block matching method, of the calculating module 130. Moreover, the calculating module 130 may calculate amounts of movement required in the positions or directions of the image capturing unit 110B (or the image capturing unit 110A) and prioritize these amounts of movement according to higher values therein until the calibration condition is satisfied, so as to complete the calibration process.

Furthermore, referring to FIG. 4A through FIG. 5E, in the present embodiment, each image capturing unit (e.g., the image capturing units 110A and 110B) in the image capturing device 110 may have six degrees of freedom (viz., displacements in the X, Y and Z axis directions, the inclination angle, the deflection angle and the flip angle). However, since the horizontal deviation is related to the displacement in the Y axis direction and the deflection angle (two degrees of freedom), and the vertical deviation is related to the displacement in the Z axis direction and the inclination angle, a calibration time may further be saved during the calibration according to the following calibration process. Taking a horizontal calibration as an example, horizontal positions of the image capturing units 110A and 110B may firstly be adjusted so as to align a plurality of near object NJ images of the near object NJ captured by the image capturing units 110A and 110B. Then, the deflection angles of the image capturing units 110A and 110B are adjusted so as to align a plurality of far object FJ images of the far object FJ captured by the image capturing units 110A and 110B. Afterward, repeatedly aligning the near object NJ images and the far object FJ images until the near object NJ images and the far object FJ images are aligned. Alignment methods are as described in FIG. 4A through FIG. 5E, and are not to be repeated herein. With this, time required for the calibration may further be saved. For example, in the present embodiment, one complete calibration requires about 10 minutes of time, and thereby the time and money saved are very impressive.

In addition, a calibration in the vertical direction is also similar to the calibration in the horizontal direction, vertical positions of the image capturing units 110A and 110B may be firstly adjusted so as to align a plurality of near object NJ images of the near object NJ captured by the image capturing units 110A and 110B. Then, the inclination angles of the image capturing units 110A and 110B are adjusted so as to align a plurality of far object FJ images of the far object FJ captured by the image capturing units 110A and 110B. Afterward, repeatedly aligning the near object NJ images and the far object FJ images until the near object NJ images and the far object FJ images are aligned. With this, the stereo camera apparatus 100 may be automatically calibrated, and thus is capable of enhancing the shooting efficiency and saving the shooting cost.

Figure 6:
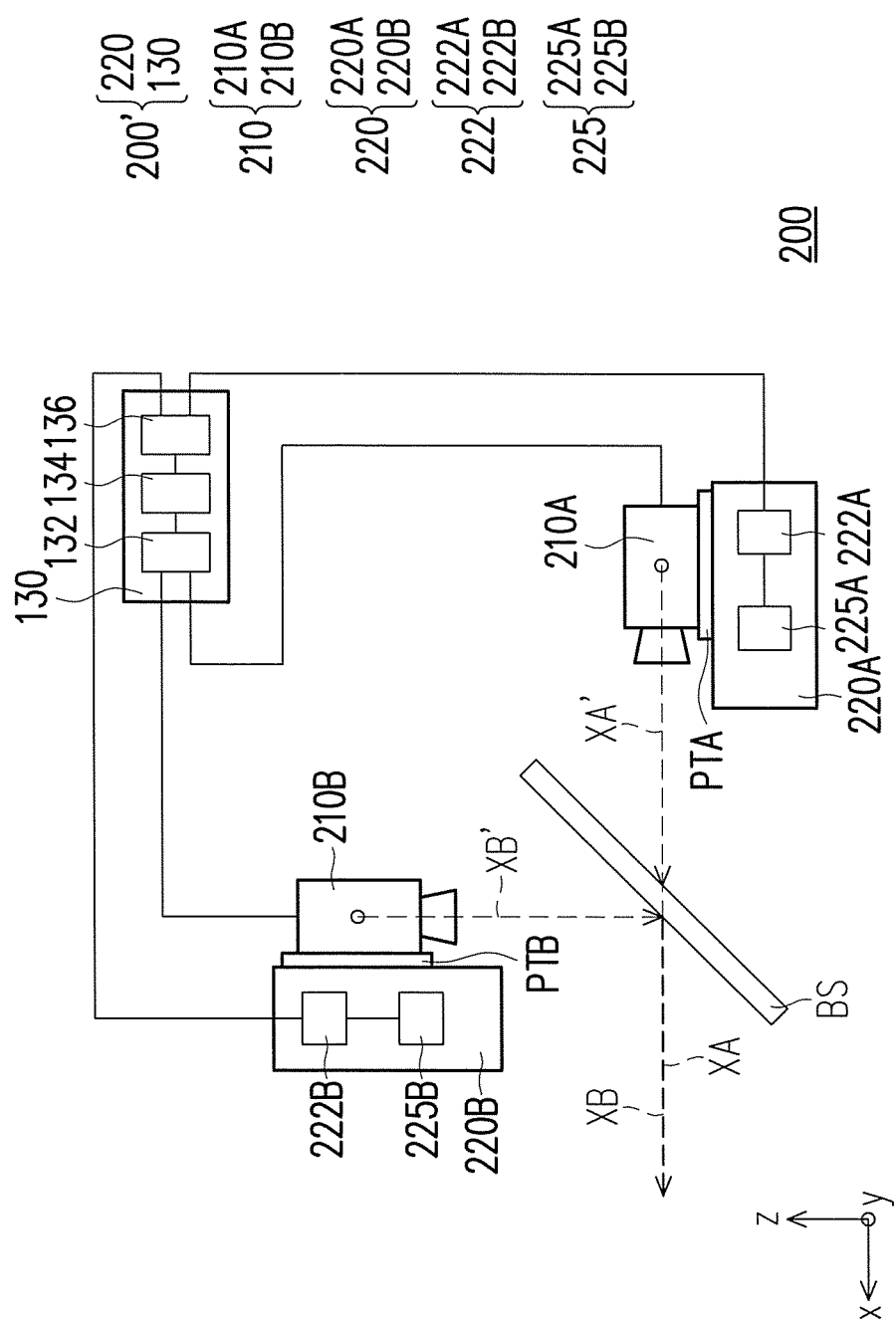
FIG. 6 is a schematic diagram illustrating a stereo camera apparatus according to another embodiment of the disclosure.

FIG. 6 is a schematic diagram illustrating a stereo camera apparatus according to another embodiment of the disclosure, referring to FIG. 1 and FIG. 6, similar to the embodiment of FIG. 1, in the present embodiment, a difference is that a stereo camera apparatus 200 may further comprise a semi-transreflective unit BS disposed in an image capture path of an image capturing units 210A and an image capture path of an image capturing units 210B, wherein a direction of a lens optical axis XA' of the image capturing units 210A and a direction of a lens optical axis XB' of the image capturing units 210B are not located on a same horizontal plane (e.g., not located on a XY plane in FIG. 6); in other words, a carrier PTA and a carrier PTB are also not located at a same horizontal plane, and so that the lens optical axis XA' of the image capturing units 210A and the lens optical axis XB' of the image capturing units 210B are facing toward different directions. In detail, the stereo camera apparatus 200 in FIG. 6 is a mirror structure. Moreover, an imaging optical axis XA and an imaging optical axis XB formed after the image capturing units 210A and the image capturing units 210B passing through the semi-transreflective unit BS are located on a same horizontal plane, thereby having functions similar to the embodiment of FIG. 1. In addition, similar to the embodiment of FIG. 1, in the present embodiment, two optical axis controlling modules 220A and 220B comprised by an optical axis controlling module 220 have a similar function as the optical axis controlling modules 120A and 120B in FIG. 1, two drive controllers 222A and 222B comprised by a drive controller 222 also have a similar function as the drive controllers 122, 122A and 122B in the embodiment of FIG. 1, and a plurality of drivers 225 (comprising drivers 225A and 225B in FIG. 6) also have a similar function as the drivers 125, 125A and 125B in FIG. 1, and are not to be repeated herein. With this, the stereo camera apparatus 200 in FIG. 6 may use a calibration process similar to the stereo camera apparatus 100 in the embodiment of FIG. 1 to perform the calibration, and may have a similar function; detail descriptions of relative devices and the calibration process may be referred to illustrations described in FIG. 1 through FIG. 5E, and are to be repeated herein. Moreover, in other embodiments, a structure of the stereo camera apparatus may be a stereo camera, a dual camera, a dual digital camera or any stereo signal generation device. Furthermore, a format of the generated stereo image signals may also be side-by-side signals, up-and-down signals, left-and-right dual signals or multi-angle signals, but the disclosure is not limited thereto.

In addition, as described in FIG. 1, the optical axis controlling module 220 and the calculating module 130 comprised by the stereo camera apparatus 200 in the embodiment of FIG. 6 may also form a self-calibration apparatus 200', and may have a similar function as the self-calibration apparatus 100' in the embodiment of FIG. 1, and thus are not to be repeated herein.

Figure 7:
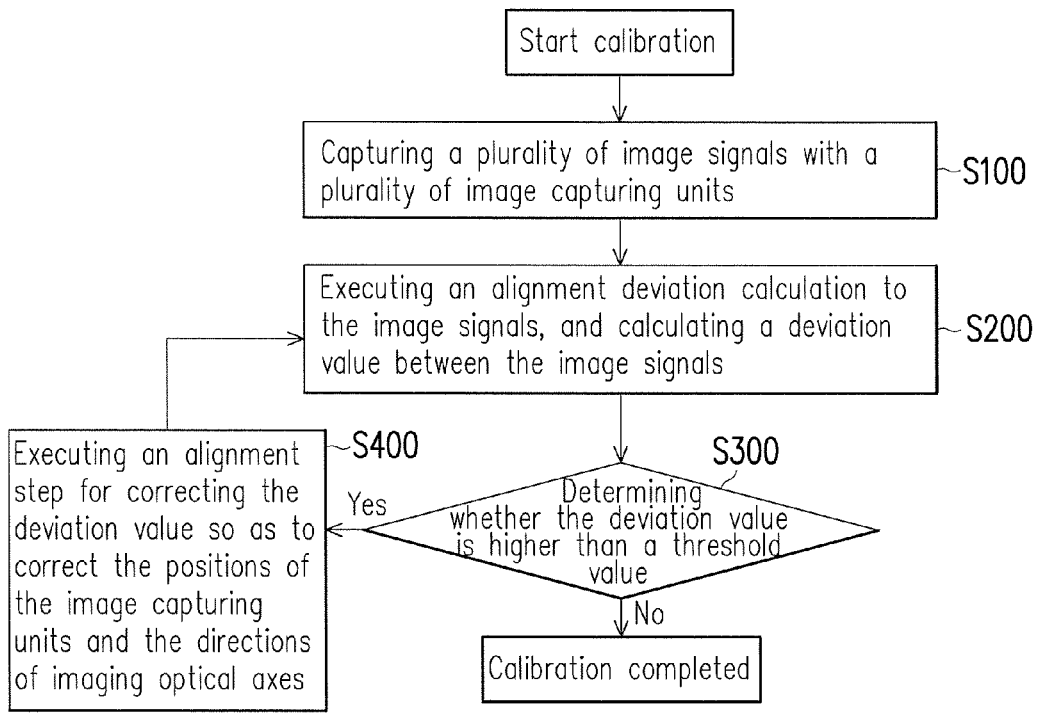
FIG. 7 illustrates a flow chart diagram of a calibration method of a stereo camera apparatus according to an embodiment of the disclosure.

FIG. 7 illustrates a flow chart diagram of a calibration method of a stereo camera apparatus according to an embodiment of the disclosure. Referring to FIG. 1 and FIG. 7, in the present embodiment, the calibration method may be used to calibrate the stereo camera apparatus 100 in the embodiment of FIG. 1. The calibration method may comprise: capturing a plurality of image signals with a plurality of image capturing units (such as the image capturing unit 110A and the image capturing unit 110B in FIG. 1) (step S100); executing an alignment deviation calculation to the image signals, and calculating a deviation value between the image signals (step S200); determining whether the deviation value is higher than a threshold value (step S300); wherein, if the deviation value is higher than the threshold value, then executing an alignment step for correcting the deviation value so as to correct the positions of the image capturing units and the directions of imaging optical axes (step S400), and re-executing an alignment deviation calculation to the image signals and calculating a deviation value between the image signals (step S200) until the deviation value is lower than the threshold value; and if the deviation value is lower than the threshold value, then the calibration is completed.

In detail, the alignment deviation calculation in the step S200 may be similar to the calculation of the calculating module 130 in the embodiment of FIG. 1, which obtains the differential image in FIG. 4C by subtracting the images illustrated in FIG. 4A and FIG. 4B. Whereas, the deviation value may be similar to the position difference produced when the checkerboard-grains and the feature points RG of FIG. 4C are not aligned. Moreover, the threshold value in the step S300 may be set according to the needs of the photographer, and in the present embodiment, it may be similar to the nearly all black different image illustrated in FIG. 4D. Since the threshold value in FIG. 4D is very small, the markings in the differential image at this preset threshold value are not easily to be detected, and the differential image seems to be completely black; in other words, the images captured by the image capturing unit 110A and the image capturing unit 110B right now is almost overlapped, but the disclosure is not limited thereto; detail descriptions may be referred to the embodiments illustrated in FIG. 4A through FIG. 4D, and thus are not to be repeated herein.

In further detail, the alignment deviation calculation may further comprise the following steps: performing a feature extraction step to capture the image signals and find out an image feature between the image signals; performing a feature calculation step to calculate positions and information of the image features; and performing a feature corresponding step to compare the positions and information of the image features and find out corresponding relationships between the image features so as to calculate the deviation value. Moreover, the calibration method may also further comprise using an image of a plurality of feature points RG on a calibration plate as the near object NJ to perform the alignment, and also using an image feature block in the image signals as the far object FJ to perform the alignment. For example, in the present embodiment, the image signals may be captured by the signal acquisition unit 132 in the embodiment of FIG. 1, and the image features comprised in the captured image signals, for example, are the feature points RG and the checkerboard-gains of the far object FJ described in FIG. 4A through FIG. 4D. The arithmetic unit 134 may execute the feature calculation step and the feature corresponding step so as to calculate the deviation value (viz., the position difference produced when the checkerboard-gains and the feature points RG described previously in FIG. 4C are not aligned), so as to facilitate the subsequent calibration.

Furthermore, the alignment step of the step S400 may comprise a horizontal direction alignment step, a vertical direction alignment step and an image alignment step. The horizontal direction alignment step is to adjust angle deviations and distance deviations in the horizontal direction between the image capturing units until the angle deviations and the distance deviations are smaller than a horizontal deviation threshold value. The vertical direction alignment step is to adjust angle deviations and distance deviations in the vertical direction between the image capturing units until the angle deviations and the distance deviations are smaller than a vertical deviation threshold value. The image alignment step is to adjust size deviations and rollover deviations of the images respectively captured by the optical axes of the image capturing units until the size deviations and the rollover deviations are smaller than the image alignment threshold value and the deviation threshold value. Wherein, the calculating module 130 may be used to control the optical axis controlling module 120 in the embodiment of FIG. 1 to execute the alignment steps. Moreover, in the present embodiment, the horizontal direction alignment step is related to the Y axis and the deflection angles, the vertical direction alignment step is related to the Z axis and the inclination angles, and the image alignment step is related to the X axis and the flip angles.

In further step, since each image capturing unit (e.g., the image capturing units 110A and 110B) in the image capturing device 110 may have six degrees of freedom (viz., displacements in the X, Y and Z axis directions, the inclination angle, the, the deflection angle and the flip angle), the horizontal deviation is related to the displacement in the Y axis direction and the deflection angle (two degrees of freedom), and the vertical deviation is related to the displacement in the Z axis direction and the inclination angle, the calibration may be referred to the calibration processes of the horizontal calibration and the vertical calibration described in FIG. 4A through FIG. 5E, and thus is not to be repeated herein.

In summary, the stereo camera apparatus and the self-calibration apparatus in the embodiment of the disclosure may calculate a calibration condition through the stereo image obtained by the image capturing device and use the optical axis controlling module to adjust and automatically calibrate the positions in the three-dimensional coordinate spaces of the X axis, the Y axis and the Z axis of each image capturing unit in the image capturing device and the angle directions of the inclination angle, the deflection angle and the flip angle. Moreover, the calibration method in the embodiment of the disclosure may perform the alignment deviation calculation to the feature points of the near object and the feature images of the far object in the captured image signals, so as to obtain the deviation value between the image signals, and when the deviation value is larger than the threshold value, the alignment step is executes to lower the deviation value to below a threshold value, thereby achieving a calibration function.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A stereo camera apparatus comprising:
an image capturing device suitable for obtaining a stereo image, the image capturing device comprising a plurality of image capturing units;
an optical axis controlling module coupled to the image capturing device; and
a calculating module coupled to the image capturing device and the optical axis controlling module, wherein the calculating module calculates a calibration condition according to the stereo image, the optical axis controlling module adjusts directions of imaging optical axes of the image capturing units in the image capturing device according to the calibration condition, and after being adjusted by the optical axis controlling module, imaging optical axes of the image capturing units are aligned, the calibration condition is determined by an alignment step which comprises:
performing a horizontal direction alignment step to adjust angle deviations and distance deviations in a horizontal direction between the image capturing units until smaller than a horizontal deviation threshold value, wherein the horizontal direction alignment step comprises:
adjusting horizontal positions of the image capturing units to align a plurality of near object images of a near object captured by the image capturing units;
adjusting deflection angles of the image capturing units to align a plurality of far object images of a far object captured by the image capturing units; and
repeatedly aligning the near object images and the far object images until the near object images and the far object images are aligned;
performing a vertical direction alignment step to adjust angle deviations and distance deviations in a vertical direction between the image capturing units until the angle deviations and the distance deviations are smaller than a vertical deviation threshold value, wherein the vertical direction alignment step comprises:
adjusting vertical positions of the image capturing units to align the plurality of near object images of the near object captured by the image capturing units;
adjusting inclination angles of the image capturing units to align the plurality of far object images of the far object captured by the image capturing units; and
repeatedly aligning the near object images and the far object images until the near object images and the far object images are aligned; and
performing an image alignment step to adjust size deviations and rollover deviations of images respectively captured by optical axis of the image capturing units until the size deviations and the rollover deviations are smaller than an image alignment threshold value and a deviation threshold value.

2. The stereo camera apparatus as recited in claim 1, wherein after being adjusted by the optical axis controlling module, the imaging optical axes of the image capturing units are aligned in a horizontal direction and a vertical direction.

3. The stereo camera apparatus as recited in claim 1, wherein after being adjusted by the optical axis controlling module, the imaging optical axes of the image capturing units are located on a same horizontal plane.

4. The stereo camera apparatus as recited in claim 1, wherein the image capturing units of the image capturing device are aligned side-by-side.

5. The stereo camera apparatus as recited in claim 1 further comprising a semi-transreflective unit disposed on image capture paths of the image capturing units, wherein lens optical axis directions of the image capturing units are not located on a same horizontal plane, and imaging optical axes of the image capturing units formed after passing through the semi-transreflective unit are located on a same horizontal plane.

6. The stereo camera apparatus as recited in claim 1, wherein the optical axis controlling module comprises a drive controller and a plurality of drivers, the drive controller drives the drivers to change positions of the image capturing units and the directions of the imaging optical axes.

7. The stereo camera apparatus as recited in claim 6, wherein the drivers move to enable the positions of the image capturing units and the directions of the imaging optical axes to approach positioning.

8. The stereo camera apparatus as recited in claim 1, wherein the optical axis controlling module controls front and rear positions, high and low positions, flip angles and inclination angles of the image capturing units and changes a spacing and deflection angles of the imaging optical axes.

9. The stereo camera apparatus as recited in claim 5, wherein the optical axis controlling module controls the semi-transreflective unit and changes imaging optical axes, a spacing and deflection angles of the image capturing units.

10. The stereo camera apparatus as recited in claim 1, wherein the calculating module further comprises:
  a signal acquisition unit receiving images respectively acquired by the image capturing units;
  an arithmetic unit coupled to the signal acquisition unit, wherein the arithmetic unit calculates the calibration condition according to features and corresponding relationships between the images respectively acquired by the image capturing units; and
  a command signal output unit converting the calibration condition into a control signal to output to the optical axis controlling module.

11. A calibration method of a stereo camera apparatus comprising:
  capturing a plurality of image signals via a plurality of image capturing units;
  executing an alignment deviation calculation to the image signals, and calculating a deviation value between the image signals;
  determining whether the deviation value is higher than a threshold value; and
  if the deviation value is higher than the threshold value, then executing an alignment step for correcting the deviation value so as to correct positions of the image capturing units and directions of imaging optical axes, and re-executing an alignment deviation calculation to the image signals until the deviation value is lower than the threshold value, wherein the alignment step comprises:
    performing a horizontal direction alignment step to adjust angle deviations and distance deviations in a horizontal direction between the image capturing units until smaller than a horizontal deviation threshold value, wherein the horizontal direction alignment step comprises:
      adjusting horizontal positions of the image capturing units to align a plurality of near object images of a near object captured by the image capturing units;
      adjusting deflection angles of the image capturing units to align a plurality of far object images of a far object captured by the image capturing units; and
      repeatedly aligning the near object images and the far object images until the near object images and the far object images are aligned;
    performing a vertical direction alignment step to adjust angle deviations and distance deviations in a vertical direction between the image capturing units until the angle deviations and the distance deviations are smaller than a vertical deviation threshold value, wherein the vertical direction alignment step comprises:
      adjusting vertical positions of the image capturing units to align the plurality of near object images of the near object captured by the image capturing units;
      adjusting inclination angles of the image capturing units to align the plurality of far object images of the far object captured by the image capturing units; and
      repeatedly aligning the near object images and the far object images until the near object images and the far object images are aligned; and
    performing an image alignment step to adjust size deviations and rollover deviations of images respectively captured by optical axis of the image capturing units until the size deviations and the rollover deviations are smaller than an image alignment threshold value and a deviation threshold value,
  if the deviation value is lower than the threshold value, then completing the calibration.

12. The calibration method as recited in claim 11, wherein the alignment deviation calculation comprises the following steps:
  performing a feature extraction step to capture the image signals and find out image features between the image signals;
  performing a feature calculation step to calculate positions and information of the image features; and
  performing a feature correspondence step to compare the positions and information of the image features, and to find out corresponding relationships between the image features to so as to extrapolate the deviation value.

13. A self-calibration apparatus suitable for self-calibrating positions of a plurality of image capturing units and directions of imaging optical axes, the self-calibration apparatus comprising:
  an optical axis controlling module coupled to the image capturing units, the optical axis controlling module comprising a plurality of carriers for assembling the image capturing units; and a calculating module coupled to the image capturing units and the optical axis controlling module, wherein the calculating module calculates a calibration condition according to a plurality of images captured by the image capturing units, the optical axis controlling module adjusts the carriers according to the calibration condition and driven adjusts directions of imaging optical axes of the image capturing units, after being adjusted by the optical axis controlling module, the imaging optical axes of the image capturing units are aligned, the calibration condition is determined by an alignment step which comprises:

performing a horizontal direction alignment step to adjust angle deviations and distance deviations in a horizontal direction between the image capturing units until smaller than a horizontal deviation threshold value, wherein the horizontal direction alignment step comprises:
adjusting horizontal positions of the image capturing units to align a plurality of near object images of a near object captured by the image capturing units;
adjusting deflection angles of the image capturing units to align a plurality of far object images of a far object captured by the image capturing units; and
repeatedly aligning the near object images and the far object images until the near object images and the far object images are aligned;

performing a vertical direction alignment step to adjust angle deviations and distance deviations in a vertical direction between the image capturing units until the angle deviations and the distance deviations are smaller than a vertical deviation threshold value, wherein the vertical direction alignment step comprises:
adjusting vertical positions of the image capturing units to align the plurality of near object images of the near object captured by the image capturing units;
adjusting inclination angles of the image capturing units to align the plurality of far object images of the far object captured by the image capturing units; and
repeatedly aligning the near object images and the far object images until the near object images and the far object images are aligned; and performing an image alignment step to adjust size deviations and rollover deviations of images respectively captured by optical axis of the image capturing units until the size deviations and the rollover deviations are smaller than an image alignment threshold value and a deviation threshold value.

14. The self-calibration apparatus as recited in claim 13, wherein after being adjusted by the optical axis controlling module, the imaging optical axes of the image capturing units are aligned in a horizontal direction and a vertical direction.

15. The self-calibration apparatus as recited in claim 13, wherein after being adjusted by the optical axis controlling module, the imaging optical axes of the image capturing units are located on a same horizontal plane.

16. The self-calibration apparatus as recited in claim 13, wherein the image capturing units assembled on the carriers are aligned side-by side.

17. The self-calibration apparatus as recited in claim 13 further comprising a semi-transreflective unit disposed on image capture paths of the image capturing units, wherein lens optical axis directions of the image capturing units assembled on the carriers are not located on a same horizontal plane, and the imaging optical axes of the image capturing units formed after passing through the semi-transreflective unit are located on a same horizontal plane.

18. The self-calibration apparatus as recited in claim 13, wherein the optical axis controlling module comprises a drive controller and a plurality of drivers, the drive controller drives the drivers to spur the carriers to adjust positions of the image capturing units and directions of imaging optical axes.

19. The self-calibration apparatus as recited in claim 18, wherein the drivers move to enable the positions of the image capturing units and the directions of the imaging optical axes to approach positioning.

20. The self-calibration apparatus as recited in claim 13, wherein the optical axis controlling module controls front and rear positions, high and low positions, flip angles and inclination angles of the carriers and changes a spacing and deflection angles of the imaging optical axes.

21. The self-calibration apparatus as recited in claim 17, wherein the optical axis controlling module controls the semi-transreflective unit and changes imaging optical axes, a spacing and deflection angles of the carriers.

22. The self-calibration apparatus as recited in claim 13, wherein the calculating module further comprises:
a signal acquisition unit receiving images respectively acquired by the image capturing units;
an arithmetic unit coupled to the signal acquisition unit, wherein the arithmetic unit calculates the calibration condition according to features and corresponding relationships between the images respectively acquired by the image capturing units; and
a command signal output unit converting the calibration condition into a control signal to output to the optical axis controlling module.

* * * * *